(12) United States Patent
Kim

(10) Patent No.: US 8,453,443 B2
(45) Date of Patent: Jun. 4, 2013

(54) ENGINE FOR ENERGY CONVERSION

(76) Inventor: Seong Woong Kim, Flushing, NY (US)

( * ) Notice: Subject to any disclaimer, the term of this patent is extended or adjusted under 35 U.S.C. 154(b) by 0 days.

(21) Appl. No.: 12/909,114

(22) Filed: Oct. 21, 2010

(65) Prior Publication Data
US 2011/0083430 A1    Apr. 14, 2011

Related U.S. Application Data (63) Continuation-in-part of application No. 12/533,031, filed on Jul. 31, 2009, now abandoned.

(60) Provisional application No. 61/085,978, filed on Aug. 4, 2008, provisional application No. 61/253,656, filed on Oct. 21, 2009.

(51) Int. Cl.
F03B 17/02 (2006.01)
F01D 25/28 (2006.01)

(52) U.S. Cl.
USPC .................. 60/496; 60/495; 415/7

(58) Field of Classification Search
USPC ... 60/495, 496, 641.1, 641.6, 641.7; 290/1 R; 415/5, 7
See application file for complete search history.

(56) References Cited

U.S. PATENT DOCUMENTS

| | | | | |
|---|---|---|---|---|
| 2,513,692 A | * | 7/1950 | Tubbs | 60/531 |
| 3,360,926 A | * | 1/1968 | Parr | 60/496 |
| 3,410,086 A | * | 11/1968 | Bodkin | 60/531 |
| 4,027,479 A | * | 6/1977 | Cory | 60/527 |
| 4,233,813 A | * | 11/1980 | Simmons | 60/496 |
| 4,325,216 A | * | 4/1982 | Mermis | 60/496 |
| 5,125,233 A | | 6/1992 | Evanger et al. | |
| 5,685,147 A | | 11/1997 | Brassea | |
| 6,100,600 A | | 8/2000 | Pflanz | |
| 2010/0024413 A1 | | 2/2010 | Kim | |

FOREIGN PATENT DOCUMENTS

| | | |
|---|---|---|
| JP | 2001-200778 A | 7/2001 |
| JP | 2007-100682 A | 4/2007 |
| WO | 2010/017127 A2 | 2/2010 |
| WO | 2011/050156 A2 | 4/2011 |

OTHER PUBLICATIONS

International Search Report and Written Opinion dated Mar. 16, 2010 in connection with International Patent Application No. PCT/US09/052553.

(Continued)

*Primary Examiner* — Kenneth Bomberg
*Assistant Examiner* — Christopher Jetton
(74) *Attorney, Agent, or Firm* — Greenberg Traurig, LLP (57) ABSTRACT

An engine for converting thermal energy to kinetic energy is provided. The engine includes a body of fluid having a first zone and a second zone, a thermal energy source thermally connected to the first zone for providing thermal energy thereto, and a thermal energy sink thermally connected to the second zone for removing thermal energy therefrom such that the first zone has a temperature greater than the second zone. The engine further includes a movable loop, which extends between the first zone and the second zone, and a plurality of containers which are positioned in the body of fluid and attached to the loop such that the loop and the containers move conjointly between the first zone and the second zone. Each of the containers expands to a first volume when it is in one of the first and second zones, and contracts to a second volume when it is in the other one of the first and second zones. A working fluid is provided in each of the said containers to cause the containers and the loop to move between the first and second zones.

23 Claims, 5 Drawing Sheets

OTHER PUBLICATIONS

International Search Report and Written Opinion in connection with Applicant's International Patent Application No. PCT/US2010/053536 (6 pages).

U.S. Appl. No. 13/841,137 on "Engine for Energy Conversion" filed Mar. 15, 2013 (41 pages).

* cited by examiner

ENGINE FOR ENERGY CONVERSION

CROSS-REFERENCE TO RELATED APPLICATION

The present application is a continuation-in-part of U.S. patent application Ser. No. 12/533,031 filed Jul. 31, 2009 now abandoned, which claims the benefit of U.S. Provisional Patent Application Ser. No. 61/085,978 filed Aug. 4, 2008. The present application also claims the benefit of U.S. Provisional Patent Application Ser. No. 61/253,656 filed Oct. 21, 2009. The disclosures of each of the aforementioned patent applications are incorporated herein by reference in their entirety.

FIELD OF THE INVENTION

The present invention relates to an engine for converting thermal energy to kinetic energy.

BACKGROUND OF THE INVENTION

The conversion of thermal energy to kinetic energy has long been utilized in the production of work. Many of the conversions use un-renewable thermal energy sources such as oil, coal, and/or natural gas which pollute the environment with undesirable by-products of combustion (e.g., carbon dioxide). It is therefore desirable to use renewal thermal energy sources such as geothermal to produce kinetic energy.

SUMMARY OF THE INVENTION

An engine for converting thermal energy to kinetic energy is provided. The engine includes a body of fluid having a first zone and a second zone, a thermal energy source thermally connected to the first zone for providing thermal energy thereto, and a thermal energy sink thermally connected to the second zone for removing thermal energy therefrom such that the first zone has a temperature greater than the second zone. The engine further includes a movable loop, which extends between the first zone and the second zone, and a plurality of containers which are positioned in the body of fluid and attached to the loop such that the loop and the containers move conjointly between the first zone and the second zone. Each of the containers expands to a first volume when it is in one of the first and second zones, and contracts to a second volume when it is in the other one of the first and second zones. A working fluid is provided in each of the containers to cause the containers and the loop to move between the first and second zones.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE EXEMPLARY EMBODIMENT

Figure 1:
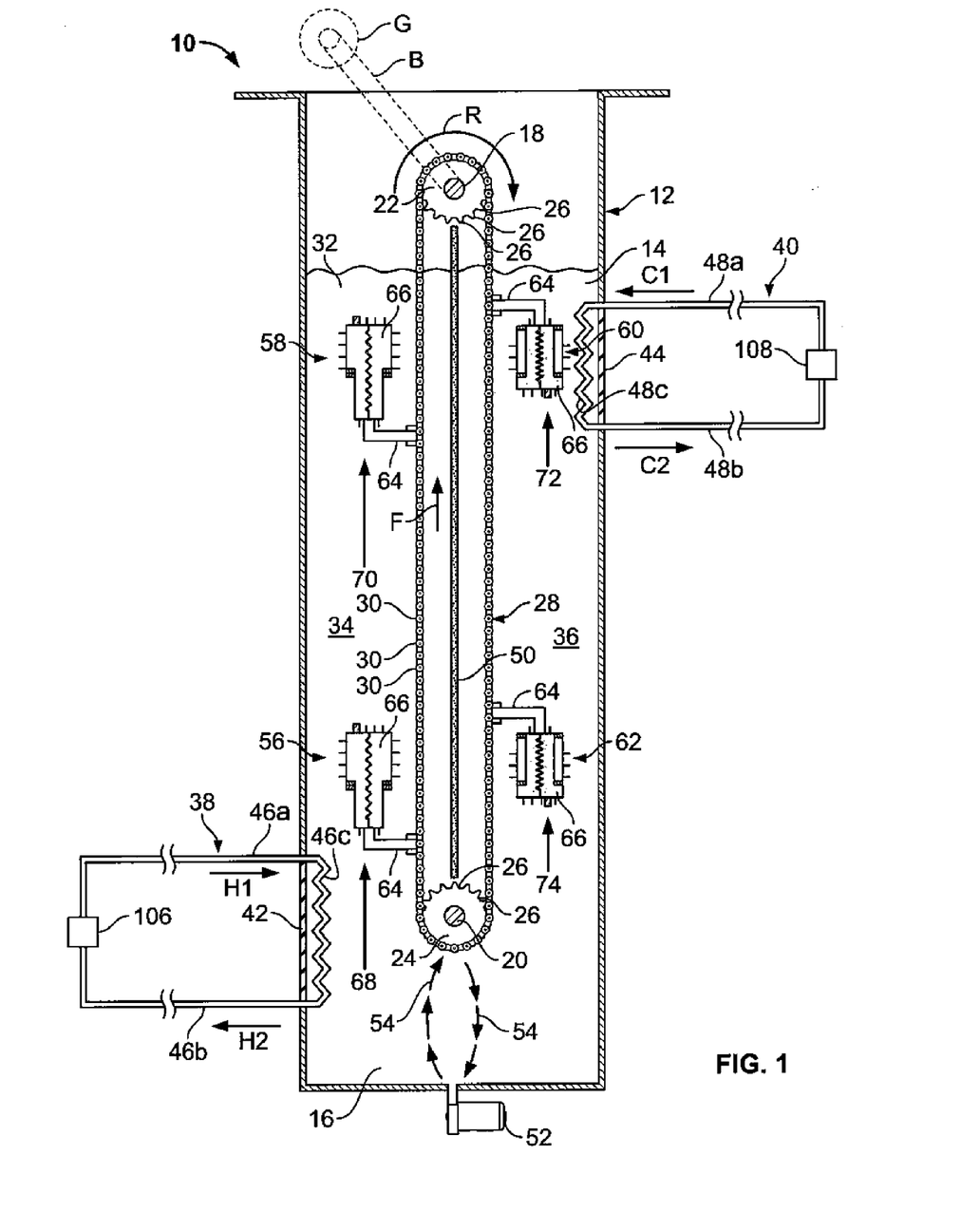
FIG. 1 is a cross-sectional schematic side view of an engine constructed in accordance with a first embodiment of the present invention, the engine having a plurality of fluid-tight containers depicted in sectional views for clarity.

FIG. 1 illustrates an engine 10 constructed in accordance with an exemplary embodiment of the present invention for converting thermal energy into kinetic energy. The engine 10 has a housing 12, which has an upper area 14 and a lower area 16. Upper and lower shafts 18, 20 are rotatably supported by the housing 12 in the upper and lower areas 14, 16, respectively, and include upper and lower sprockets 22, 24, respectively, which are fixedly mounted thereon and each of which is equipped with teeth 26. A loop of chain 28 (e.g., a loop of roller-chain, belt, cable, etc.) having a plurality of links 30 is provided so as to roll over the upper and lower sprockets 22, 24. More particularly, the links 30 of the chain 28 are adapted to mesh with the teeth 26 of the upper and lower sprockets 22, 24 so that longitudinal movement in the chain 28 produces rotational movement in the sprockets 22, 24 and hence the upper and lower shafts 18, 20.

Liquid 32 (e.g., water or any other suitable fluid) is contained in the housing 12 and has a hot liquid zone 34 and a cool liquid zone 36. A thermal energy source 38 and a thermal energy sink 40 are connected to the hot and cold liquid zones 34, 36, respectively, and are retained by liquid-tight seals 42, 44, respectively. The thermal energy source 38 includes pipes or tubes 46a, 46b and a heat exchanger 46c, which is connected to the pipes 46a, 46b, for providing thermal energy to the hot liquid zone 34. More particularly, hot liquid or gas (not shown), which is heated by a renewable energy source 106 (e.g., solar, geothermal, ocean-thermal, etc.), flows through the pipe 46a into the hot liquid zone 34 (as indicated by arrow H1 in FIG. 1). The hot liquid or gas then flows through the heat exchanger 46c, wherein thermal energy is transferred to the hot liquid zone 34, and out of the hot liquid zone 34 through the pipe 46b (as indicated by arrow H2 in FIG. 1). Similarly, the thermal energy sink 40 includes pipes or tubes 48a, 48b and a heat exchanger 48c, which is connected to the pipes 48a, 48b, for removing thermal energy from the cold liquid zone 36. More particularly, cold liquid or gas (not shown), which is cooled by a renewable energy sink 108 (e.g., geothermal, ocean-thermal, etc.), flows through the tubing 48a into the cold liquid zone 36 (as indicated by arrow C1 in FIG. 1). The cold liquid or gas then flows through the heat exchanger 48c, wherein thermal energy is removed from the cold liquid zone 36, and out of the cold liquid zone 36 through the pipe 48b (as indicated by arrow C2 in FIG. 1). The heat exchanger 46c and the heat exchanger 48c may be provided with conventional heat transfer mechanisms (e.g., fins) that facilitate the transfer of heat into and out of the hot and cold liquid zones 34, 36, respectively. Moreover, to promote heat exchange efficiently, the energy source 38 is positioned proximate the lower area 16 of the housing 12, while the energy sink 40 is positioned proximate the upper area 14 of the housing 12 (e.g., proximate the upper sprocket 22).

A baffle 50 is positioned in the housing 12 (e.g., within the confines of an inner loop formed by the chain 28) to abate the direct intermixing of thermal energy between the hot and cool liquid zones 34, 36. A water pump 52 is also provided to create a circulating water current 54 that may be located proximate the lower area 16 of the housing 12 (e.g., below the baffle 50 and outside the confines of the chain 28). The circulating water current 54 forms a water curtain so as to further inhibit the intermixing of thermal energy between the hot liquid zone 34 and the cold liquid zone 36 in the lower area 16.

Continuing to refer to FIG. 1, gas or fluid-tight containers 56, 58, 60, 62 are attached to the chain 28 by brackets 64 and are immersed in the liquid 32. The containers 56, 58, 60, 62 are adapted to move sequentially through the hot and cold zones 34, 36 so as to cause the chain 28 and the sprockets 22, 24 to rotate. In order to cause such rotation, each of the containers 56, 58, 60, 62 is provided with a working fluid 66 which may be air, carbon dioxide, refrigerant or any other fluid know in the art. The working fluid 66 is adapted to expand and contract in order to cause the volume of the containers 56, 58, 60, 62 to increase or decrease. The construction and operation of the containers 56, 58, 60, 62 will be discussed below in greater detail.

Figure 2:
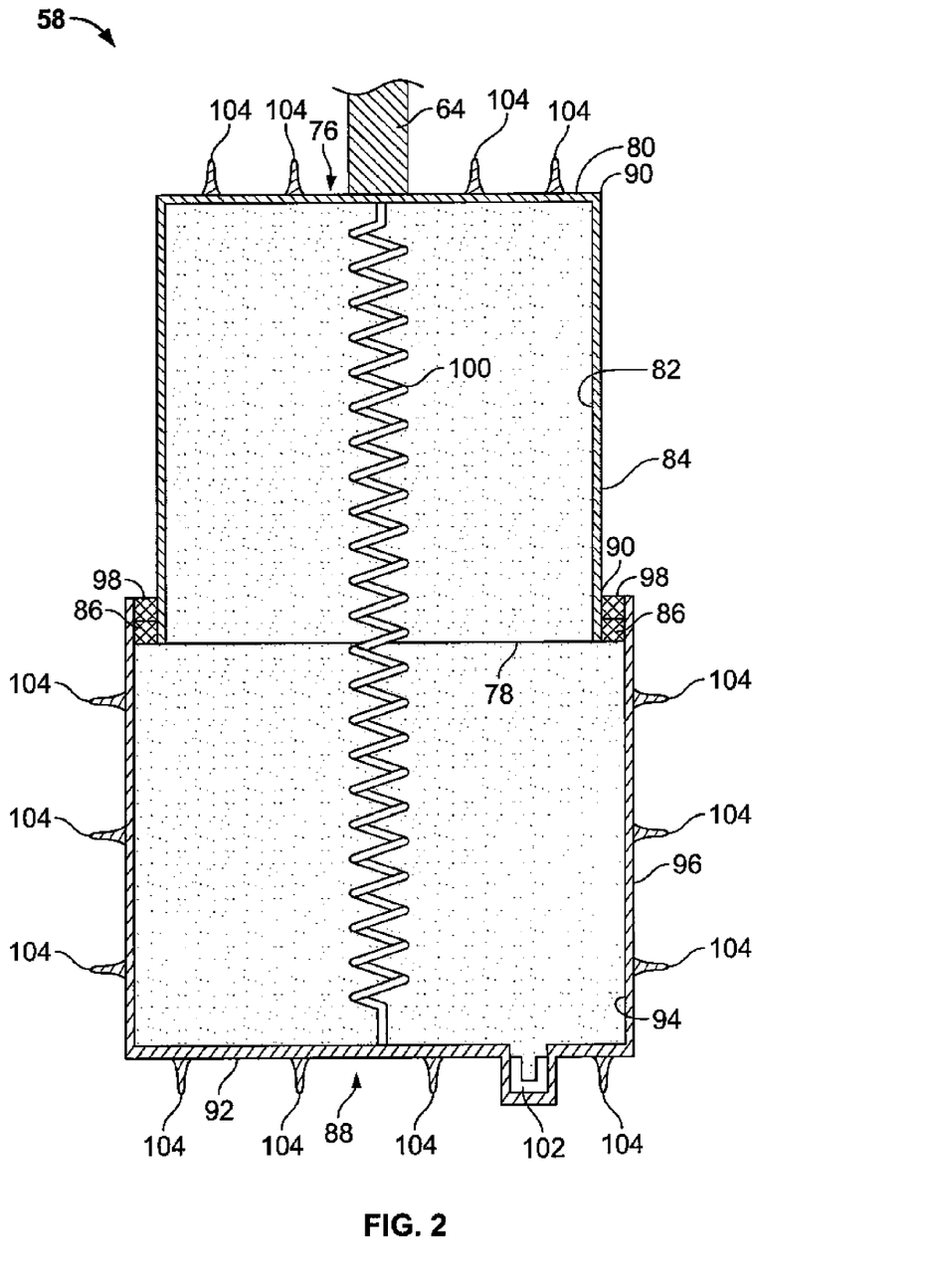
FIG. 2 is an enlarged cross-sectional view of one of the gas tight containers shown in FIG. 1, the container being shown in its contracted position.
Figure 3:
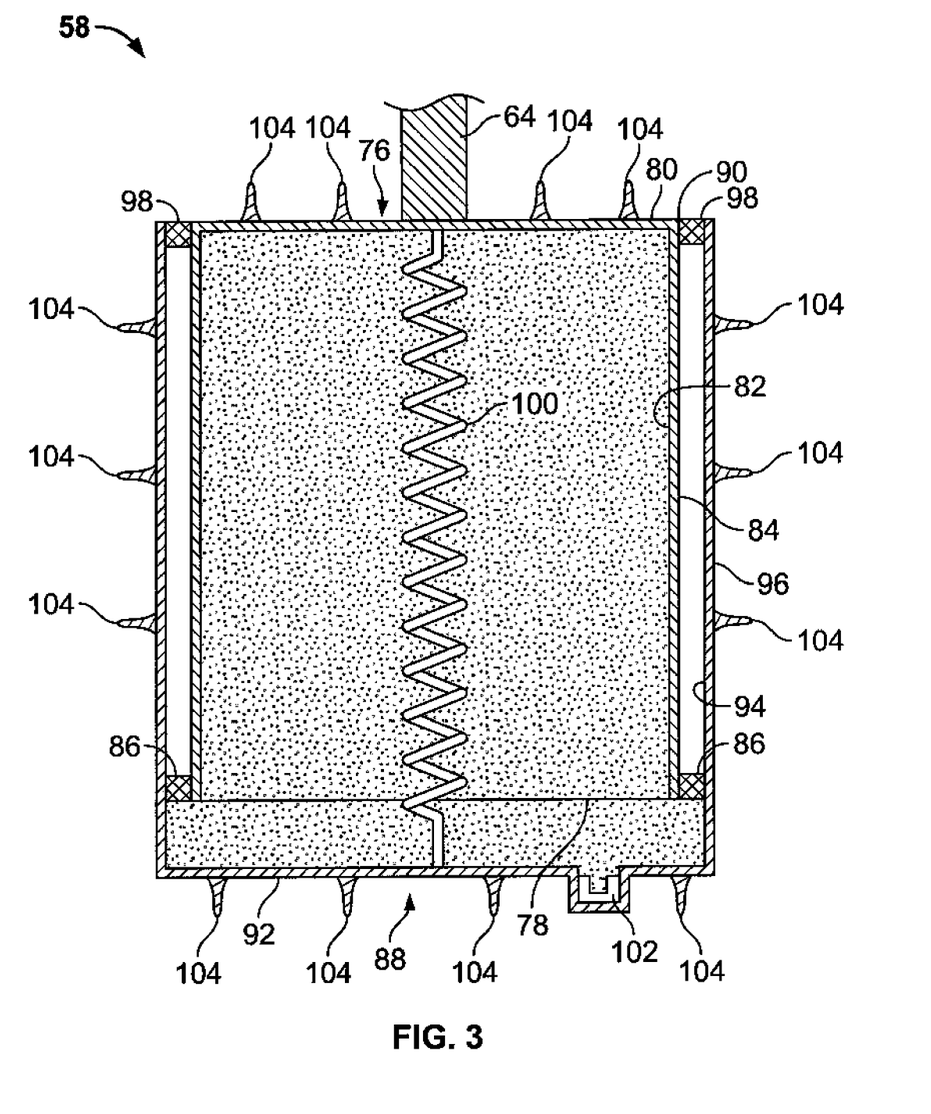
FIG. 3 is an enlarged cross-sectional view of one of the containers shown in FIG. 1, the container being shown in its expanded position.

Referring to FIGS. 2 and 3, the container 58 includes an inner cylinder 76, which has an open end 78 and a closed end 80, and inner and outer surfaces 82, 84. The container 58 also includes an outer cylinder 88 having an open end 90 and a closed end 92, as well as inner and outer surfaces 94, 96. The outer cylinder 88 is slidably attached to the inner cylinder 76 such that the outer cylinder 88 is moveable relative to the inner cylinder 76 between a collapsed position, in which the inner cylinder 76 is positioned within the outer cylinder 88 (see FIG. 3), and an expanded position, in which the inner cylinder 76 extends outwardly from the outer cylinder 88 (see FIG. 2). A sealing ring 86 is positioned between the outer surface 84 of the inner cylinder 76 and the inner surface 94 of the outer cylinder 88 proximate the open end 78 so as to make the container 58 fluid tight. At least one retaining ring 98 is attached to the outer cylinder 88 proximate the open end 90 so as to prevent the outer cylinder 88 from sliding off the inner cylinder 76. A coil spring 100 or other suitable elastomeric urging element is also attached to the closed end 80 of the inner cylinder 76 and the closed end 92 of the outer cylinder 88 so as to urge the outer cylinder 88 to move towards its collapsed position. A valve 102 is provided for filling the container 58 with the working fluid 66. Fins 104 are disposed on the outer surfaces 84, 96 of the inner and outer cylinders 76 and 88, respectively, so as to facilitate the transfer of heat into and out of the working fluid 66 contained therewithin. The inner and outer cylinders 76 and 88 may be fabricated from any suitable corrosion resistant, thermally conductive material (e.g., plastic or metal).

Each of the containers 56, 60, 62 has a construction and operation which are identical to those of the container 58 illustrated in FIGS. 2 and 3. In such circumstances, the specific construction of the containers 56, 60, 62 will not be discussed herein.

The operation of the engine 10 will now be discussed with reference to FIG. 1. In FIG. 1, the containers 56, 58 are located in the hot liquid zone 34, while the containers 60, 62 are located in the cold liquid zone 36. The working fluid 66 in each of the containers 56, 58 absorbs thermal energy from the hot liquid zone 34 and expands, causing the outer cylinders 88 to move from their contracted positions (see FIG. 3) to their expanded positions (see FIG. 2) and thereby causing the volume of the containers 56, 58 to increase (i.e., the containers 56, 48 expand to an expanded volume). Since the working fluid 66 in the containers 56, 58 has an increased volume but the same mass, it provides increased buoyant forces 68, 70 acting on the containers 56, 58, respectively. In contrast, the working fluid 66 in each of the containers 60, 62 releases its thermal energy to the cold liquid zone 36 and contract, causing the outer cylinders 88 to move from their expanded positions (see, e.g., FIG. 2) to their contracted positions (see, e.g., FIG. 3) and thereby causing the volume of the containers 60, 62 to decrease (i.e., the containers 60, 62 contract to a decreased volume). Since the working fluid 66 in the containers 60, 62 has a decreased volume but the same mass, it provides decreased buoyant forces 72, 74 acting on the containers 60, 62, respectively. As a result, the sum of the buoyant forces 68, 70 acting on the containers 56, 58 is greater than the sum of the buoyant forces 72, 74 acting in the containers 60, 62, thereby resulting in a resultant force F which causes the chain 28 to rotate in a clockwise direction (as indicated by arrow R in FIG. 1). As a result of the continuous flow of thermal energy into and out of the hot and cold liquid zones 34, 36, respectively, the containers 56, 58, 60, 62 continuously move between the hot and cold liquid zones 34, 36, thereby imparting continuous motion to the chain 28. The movement of the chain 28 imparts rotational kinetic energy to the upper and lower sprockets 22, 24 and hence the shafts 18, 20. A suitable mechanism may be employed to store and/or utilize the rotational kinetic energy of the shafts 18, 20. For example, an electric generator G (shown in phantom in FIG. 1) may be driven by the shaft 18 via a belt B to convert the kinetic energy to electric energy.

The present invention provides a number of benefits and advantages. For instance, the conversion of renewable thermal energy to kinetic energy is performed in an environmentally friendly and cost effective manner. The production of kinetic energy is provided in a mechanically simple manner (i.e., the force F produces motion in the chain 28 which imparts rotational kinetic energy to the sprockets 22, 24 and hence the shafts 18, 20).

It should be noted that the present invention can have numerous modifications and variations. For instance, the containers 56, 58, 60, and 62 may be fabricated from expandable and contractible components that are formed in different sizes and shapes, such as a balloon-shaped bladder fabricated from a single piece of elastomeric material. Individual engines may be fabricated with a combination of differently sized and shaped containers. The retaining ring 98 may also be sized and shaped to function as a back-up sealing ring (i.e., it may function as a secondary seal to contain the working fluid 66 in the containers 56, 58, 60, 62, should the sealing ring 86 leak). The surface of the liquid 32 may be set at an elevation (not shown) in the housing 12 such that the upper sprocket 22 is submerged in the liquid 32 and the containers 56, 58, 60, 62 are submerged in the liquid through their movement between the hot and cold liquid zones 34, 36.

Figure 4:
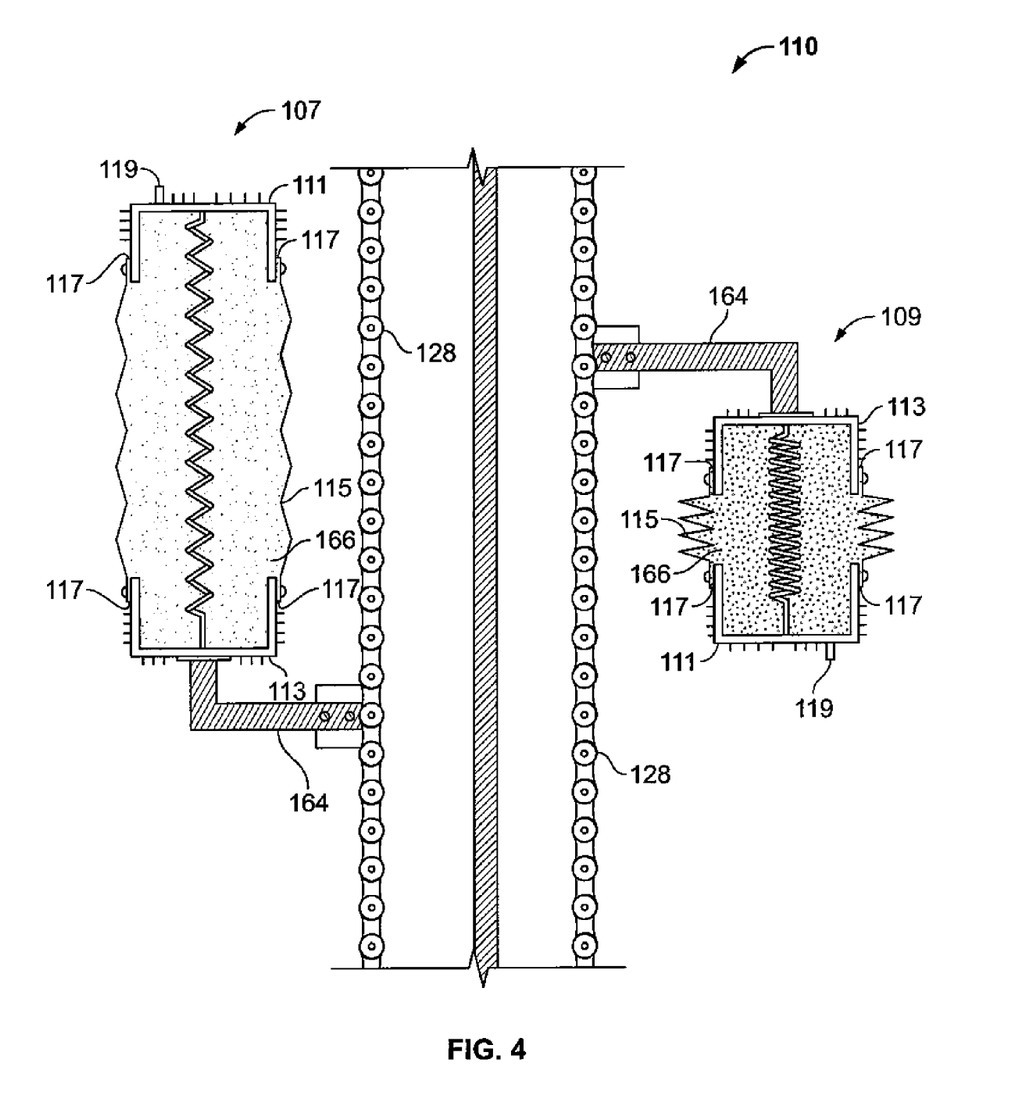
FIG. 4 is partial cross-sectional schematic side view of an engine constructed in accordance with a second embodiment of the present invention.
Figure 5:
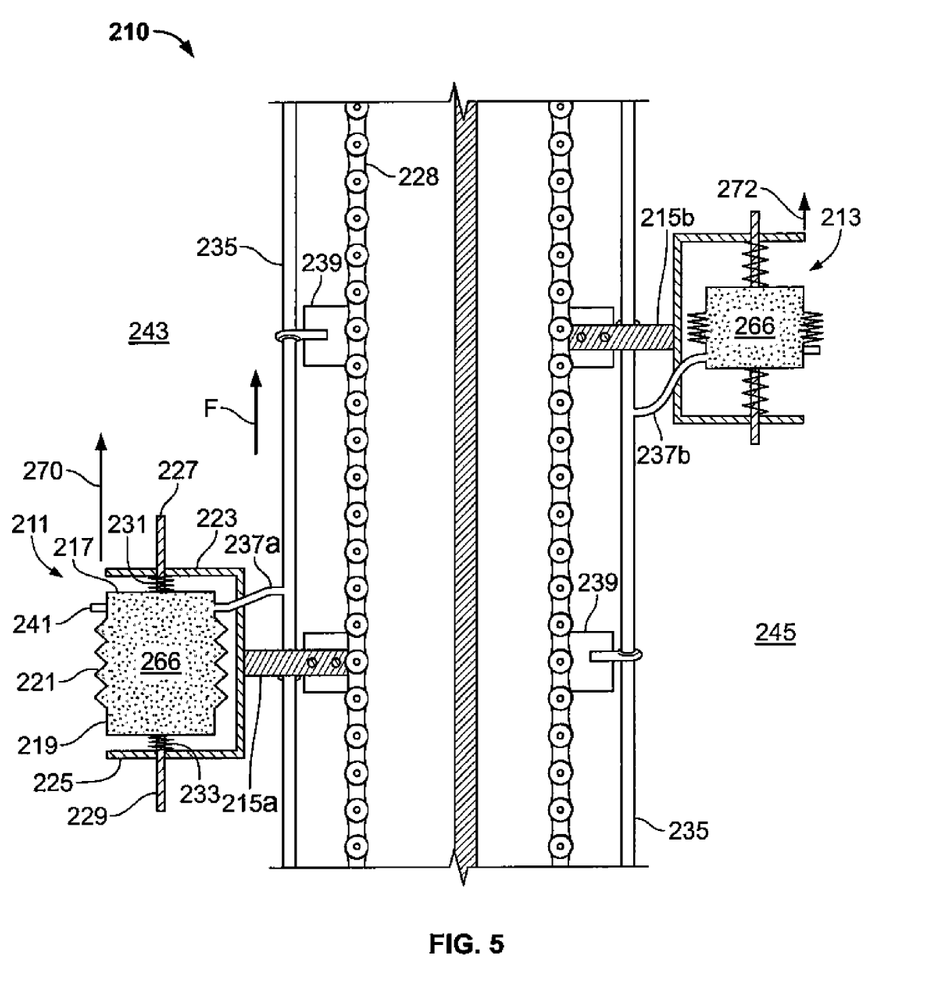
FIG. 5 is partial cross-sectional schematic side view of an engine constructed in accordance with a third embodiment of the present invention.

FIGS. 4 and 5 illustrate second and third exemplary embodiments, respectively, of the present invention. The elements illustrated in FIG. 4, which correspond to the elements described above with reference to FIGS. 1-3, have been designated by corresponding reference numerals increased by one hundred, while new elements are designated by odd reference numerals in the one hundreds. Likewise, the elements illustrated in FIG. 5 have been designated by corresponding reference numerals increased by two hundred, while new elements are designated by odd reference numerals in the two hundreds. The embodiments shown in FIGS. 4 and 5 operate and are constructed in a manner consistent with the embodiment of FIGS. 1-3, unless otherwise indicated.

Referring to FIG. 4, an engine 110 is illustrated having gas or liquid-tight containers 107 and 109 that are attached to a chain 128 by brackets 164. It is noted that FIG. 4 illustrates only a portion of the engine 110, which may be provided with additional containers (not shown) that are identical, in construction and operation, to the containers 107 and 109. It is noted that the engine 110 is identical to the engine 10 in all respects, except that the containers 56, 58, 60, 62 are provided with a different construction. The construction of the containers 107, 109 is discussed below.

Each of the containers 107 and 109 has a pair of rigid caps 111, 113 that are attached to a bellows 115 by seals 117. The bellows 115 are fabricated out of flexible material such as rubber. The bellows 115 facilitate the movement of the containers 107, 109 from a contracted position (see the container 109 in FIG. 4) to an expanded position (see the container 107 in FIG. 4) and visa versa. Each of the containers 107, 109 also has a valve 119 through which gas or liquid is initially supplied to the containers 107, 109.

Now referring to FIG. 5, an engine 210 is equipped with a plurality of gas or liquid-filled containers 211, 213, which are attached to a chain 228 via brackets 215a, 215b, respectively. It is noted that FIG. 5 illustrates only a portion of the engine 210, which may be provided with additional containers (not shown) that are identical, in construction and operation, to the containers 211, 213. It is also noted that the engine 210 has a construction and operation that are basically identical to those of the engine 10 shown in FIG. 1 and/or the engine 110 shown in FIG. 4, except as discussed below.

With reference to FIG. 5, the container 211 has end portions or caps 217, 219 and a bellows portion 221, which adjoins the end portions 217, 219 to each other in a fluid-tight manner. The end portions 217, 219 and the bellows portion 221 are constructed and assembled in a manner similar to the manner in which the rigid caps 111, 113 and bellows 115 shown in FIG. 4 are constructed. The bellows portion 221 facilitates the movement of the container 211 from an expanded position (see the container 211 in FIG. 5) to a compressed position (see, for instance, the container 213 in FIG. 5) and visa versa. The end portion 217 is equipped with a valve 241 through which a gas or liquid is initially supplied to the container 211.

The bracket 215a has a pair of braces 223, 225, between which the container 211 is interposed. Support bars 227, 229, which are affixed to the end portions 217, 219, respectively, of the container 211, are slidably supported by the braces 223, 225, respectively, such that they are longitudinally movable relative to the braces 223, 225, respectively. More particularly, the support bars 227, 229 movably support the container 211 on the bracket 215a such that the container 211 can expand and contract during the operation of the engine 210.

Temperature sensitive springs 231, 233 are disposed on the support bars 227, 229, respectively. More particularly, the spring 231 is positioned between, and attached to, the brace 223 and the end portion 217 of the container 211, while the spring 233 is positioned between, and attached to, the brace 225 and the end portion 219 of the container 211. Each of the springs 231, 233, which can be made from a conventional shape memory alloy, utilizes heating and cooling to move between a high-temperature shape and a low temperature shape. More particularly, each of the springs 231, 233 expands and contracts based on the temperature of the surrounding liquid or fluid to which they are exposed so as to cause the container 211 to move between its expanded and compressed positions.

The container 213 has a construction and operation that are basically identical to those of the container 211. In such circumstances, the specific construction of the container 213 will not be discussed herein.

A fluid hose 235 is connected to the containers 211, 213 via exhaust hoses 237a, 237b, respectively. The fluid hose 235 is affixed to the chain 228 via a plurality of hose brackets 239 so that the fluid hose 235 is movable conjointly with the chain 228 and, hence, the containers 211, 213. The fluid hose 235, which form a loop around the chain 228, functions as a conduit through which gas or liquid may flow from the container 211 to the container 213 and vice versa, thus facilitating the expansion and contraction of the containers 211, 213 in a manner further discussed below. The fluid hose 235, the exhaust hoses 237a, 237b, and the containers 211, 213 form a closed (i.e., fluid-tight) system such that the amount of fluid contained in the system remains substantially constant (i.e., the fluid does not escape from the system).

In operation, the engine 210 is immersed in a liquid having a cold liquid zone 243, which is connected to a thermal energy sink (not shown), and a hot liquid zone 245, which is connected to a thermal energy source (not shown). The containers 211, 213 and the fluid hose 235 are filled with a working fluid 266 (e.g., a gas) via the valve 241. The working fluid 266 has a lower density than that of the liquid surrounding the containers 211, 213.

When the container 211 is in the cold liquid zone 243, the springs 231, 233 contract to their respective low-temperature shapes. Because the low-temperature shape of each of the springs 231, 233 has a length smaller than that of its high-temperature shape, the springs 231, 233 pull the end portions 217, 219, respectively, of the container 211 away from one another (i.e., toward the braces 223, 225, respectively), thereby causing the container 211 to expand to its expanded position (see the container 211 in FIG. 5). As discussed above, the container 211 is in fluid communication with the fluid hose 235, which in turn is in fluid communication with the container 213. In such circumstances, as the container 211 expands, working fluid 266 flows into the container 211 from the fluid hose 235, the container 213 and/or other containers of the engine 210, thereby increasing the volume or amount of the working fluid 266 present in the container 211. Due to its increased volume/amount, the working fluid 266 in the container 211 provides an increased buoyant force 270 acting on the container 211.

In contrast, when the container 213 is in the hot liquid zone 245, its temperature sensitive springs expand to their respective high-temperature shapes (see FIG. 5), which have a length greater than their low-temperature shapes. As a result, the springs push end portions (i.e., end caps) of the container 213 towards one another, thereby causing the container 213 to contract to its compressed position (see the container 213 in FIG. 5). Because the container 213 is in fluid communication with the fluid hose 235, at least some working fluid 266 flow out from the container 213 into the fluid hose 235, the container 211 and/or other containers of the engine 210, thereby decreasing the volume or amount of the working fluid 266 in the container 213. Due to its decreased volume/amount, the working fluid 266 remaining in the container 213 provides a decreased buoyant force 272 acting on the container 213. The decreased buoyant force 272 acting on the container 213 is smaller than the buoyant force 270 acting on the container 211. As a result, a resultant force F acts on the chain 228 to move same in a clockwise direction. Due to the continuous flow of thermal energy into and out of the hot and cold liquid zones 245, 243, respectively, the containers 211, 213 continuously move between the cold and hot liquid zones 243, 245, thereby imparting continuous motion to the chain 228.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

I claim:
1. Apparatus for converting thermal energy to kinetic energy, comprising a body of fluid having a first zone and a second zone; a thermal energy source thermally connected to said first zone for providing thermal energy to said first zone; a thermal energy sink thermally connected to said second zone for removing thermal energy from said second zone such that said first zone has a temperature greater than said second zone; a movable loop extending between said first zone and said second zone; and a plurality of containers positioned in said body of fluid, each of said containers being attached to said loop such that it is moveable conjointly with said loop between said first zone and said second zone, each of said containers being expandable to a first volume when it is in one of said first and second zones and being contractible to a second volume, which is smaller than said first volume, when it is in the other one of said first and second zones, each of said containers having a working fluid therein for causing said containers and hence said loop to move between said first and second zones, said working fluid of each of said containers providing a first buoyant force and a second buoyant force when a corresponding one of said containers is in said first volume and said second volume, respectively, said first buoyant force being greater than said second buoyant force, at least one of said containers being positioned in said one of said first and second zones, at least another of said containers being positioned in said other one of said first and second zones, said first buoyant force acting on said at least one of said containers being greater than said second buoyant force acting on said at least another of said containers, whereby said loop is caused to move in a predetermined direction, each of said containers including at least one temperature-sensitive spring for causing the expansion of a corresponding one of said containers to said first volume and the contraction of a corresponding one of said containers to said second volume, each of said temperature-sensitive springs of said containers having a high-temperature shape when a corresponding one of said containers is in said first zone and a low-temperature shape when a corresponding one of said containers is in said second zone.

2. The apparatus of claim 1, further comprising a fluid hose connected to said containers such that the containers are in fluid communication with one another, thereby allowing said working fluid to flow from one of said containers to another of said containers.

3. The apparatus of claim 2, wherein the amount of said working fluid in each of said containers when it is in its said first volume is greater than the amount of said working fluid in said each of said containers when it is in its said second volume.

4. The apparatus of claim 1, wherein at least two of said containers are positioned in said one of said first and second zones, and at least two of said containers are positioned in said other one of said first and second zones, the sum of said first buoyant forces acting on said at least two of said containers in said one of said first and second zones being greater than the sum of said second buoyant forces acting on said at least two of said containers in said other one of said first and second zones.

5. The apparatus of claim 1, wherein said loop is oriented generally vertically, said first zone is positioned on one lateral side of said loop, and said second zone is positioned on an opposite lateral side of said loop.

6. The apparatus of claim 1, further comprising a first and second sprockets, said housing having an upper end, said first sprocket being positioned adjacent said upper end of said housing, said second sprocket being positioned adjacent said lower end of said housing, said loop being looped over said first and second sprockets for causing said first and second sprockets to rotate in response to the movement of said loop; and first and second shafts connected to said first and second sprockets, respectively, for rotation therewith.

7. The apparatus of claim 1, further comprising means coupled to at least one of said first and second shafts for using kinetic energy associated with said at least one of said first and second shafts.

8. The apparatus of claim 1, further comprising an electric generator coupled to at least one of said first and second shafts for converting kinetic energy associated with said at least one of said first and second shafts into electrical energy.

9. The apparatus of claim 1, further comprising a baffle positioned between said first and second zones so as to inhibit intermixing of fluid between said first and second zones.

10. The apparatus of claim 1, wherein said baffle extends between said first and second sprockets and is positioned within said loop.

11. The apparatus of claim 1, further comprising creating means for creating a fluid curtain below said second sprocket so as to inhibit intermixing of fluid between said first and second zones.

12. The apparatus of claim 1, wherein said thermal energy source includes a first heat exchanger positioned in said first zone.

13. The apparatus of claim 12, wherein said thermal energy source includes an external energy source connected to said first heat exchanger, said external energy source including a renewable energy source selected from the group consisting of solar energy, geothermal energy and ocean-thermal energy sources.

14. The apparatus of claim 12, wherein said thermal heat sink includes a second heat exchanger positioned in said second zone.

15. The apparatus of claim 14, wherein said thermal heat sink includes an external heat sink connected to said second heat exchanger.

16. The apparatus of claim 1, wherein each of said containers includes a bellows such that a corresponding one of said containers can expand to its said first volume and contract to its said second volume.

17. Apparatus for converting thermal energy to kinetic energy, comprising a body of fluid having a first zone and a second zone; a housing containing said body of water and having an upper end and a lower end; a thermal energy source thermally connected to said first zone for providing thermal energy to said first zone; a thermal energy sink thermally connected to said second zone for removing thermal energy from said second zone such that said first zone has a temperature greater than said second zone; a movable loop extending between said first zone and said second zone, said loop being oriented generally vertically, said first zone being positioned on one lateral side of said loop, said second zone being positioned on an opposite lateral side of said loop; first and second sprockets, said first sprocket being positioned adjacent said upper end of said housing, said second sprocket being positioned adjacent said lower end of said housing, said loop being looped over said first and second sprockets for causing said first and second sprockets to rotate in response to the movement of said loop; first and second shafts connected to said first and second sprockets, respectively, for rotation therewith; a plurality of containers positioned in said body of fluid, each of said containers being attached to said loop such that it is moveable conjointly with said loop between said first zone and said second zone, each of said containers being expandable to a first volume when it is in one of said first and second zones and being contractible to a second volume, which is smaller than said first volume, when it is in the other one of said first and second zones, each of said containers having a working fluid therein for causing said containers and hence said loop to move between said first and second zones, said working fluid of each of said containers providing a first buoyant force and a second buoyant force when a corresponding one of said containers is in said first volume and said second volume, respectively, said first buoyant force being greater than said second buoyant force, at least two of said containers being positioned in said one of said first and second zones, at least two of said containers being positioned in said other one of said first and second zones, the sum of said first buoyant forces acting on said at least two of said containers in said one of said first and second zones being greater than the sum of said second buoyant forces acting on said at least two of said containers in said other one of said first and second zones, whereby said loop is caused to move in a predetermined direction; a baffle positioned between said first and second zones so as to inhibit intermixing of fluid between said first and second zones, said baffle extending between said first and second sprockets and being positioned within said loop; and creating means for creating a fluid curtain below said second sprocket so as to inhibit intermixing of fluid between said first and second zones.

18. The apparatus of claim 17, wherein each of said containers includes at least one temperature-sensitive spring for causing the expansion of a corresponding one of said containers to said first volume and the contraction of a corresponding one of said containers to said second volume, each of said temperature-sensitive springs of said containers having a high-temperature shape when a corresponding one of said containers is in said first zone and a low-temperature shape when a corresponding one of said containers is in said second zone.

19. Apparatus for converting thermal energy to kinetic energy, comprising a body of fluid having a first zone and a second zone; a thermal energy source thermally connected to said first zone for providing thermal energy to said first zone, said thermal energy source including a first heat exchanger, which is positioned in said first zone, and an external energy source, which is connected to said first heat exchanger and includes a renewable energy source selected from the group consisting of solar energy, geothermal energy and ocean-thermal energy sources; a thermal energy sink thermally connected to said second zone for removing thermal energy from said second zone such that said first zone has a temperature greater than said second zone, said thermal heat sink including a second heat exchanger, which is positioned in said second zone, and an external heat sink, which is connected to said second heat exchanger; a movable loop extending between said first zone and said second zone; and a plurality of containers positioned in said body of fluid, each of said containers being attached to said loop such that it is moveable conjointly with said loop between said first zone and said second zone, each of said containers being expandable to a first volume when it is in one of said first and second zones and being contractible to a second volume, which is smaller than said first volume, when it is in the other one of said first and second zones, each of said containers having a working fluid therein for causing said containers and hence said loop to move between said first and second zones, said working fluid of each of said containers providing a first buoyant force and a second buoyant force when a corresponding one of said containers is in said first volume and said second volume, respectively, said first buoyant force being greater than said second buoyant force, at least one of said containers being positioned in said one of said first and second zones, at least another of said containers being positioned in said other one of said first and second zones, said first buoyant force acting on said at least one of said containers being greater than said second buoyant force acting on said at least another of said containers, whereby said loop is caused to move in a predetermined direction.

20. The apparatus of claim 19, wherein said external heat sink includes a renewable energy sink.

21. The apparatus of claim 19, further comprising a fluid hose connected to said containers such that the containers are in fluid communication with one another, thereby allowing said working fluid to flow from one of said containers to another of said containers.

22. The apparatus of claim 21, wherein the amount of said working fluid in each of said containers when it is in its said first volume is greater than the amount of said working fluid in said each of said containers when it is in its said second volume.

23. The apparatus of claim 19, wherein said loop includes a chain link.

* * * * *